United States Patent
Sagawai

(10) Patent No.: US 11,631,389 B2
(45) Date of Patent: Apr. 18, 2023

(54) INPUT DEVICE

(71) Applicant: ALPS ALPINE CO., LTD., Tokyo (JP)

(72) Inventor: Shinichi Sagawai, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/326,774

(22) Filed: May 21, 2021

(65) Prior Publication Data
US 2021/0287648 A1 Sep. 16, 2021

Related U.S. Application Data

(63) Continuation of application No. PCT/JP2019/043440, filed on Nov. 6, 2019.

(30) Foreign Application Priority Data

Dec. 10, 2018 (JP) .............................. JP2018-231045

(51) Int. Cl.
*G10K 11/16* (2006.01)
*G06F 3/041* (2006.01)
*G06F 3/01* (2006.01)

(52) U.S. Cl.
CPC .............. *G10K 11/16* (2013.01); *G06F 3/016* (2013.01); *G06F 3/041* (2013.01)

(58) Field of Classification Search
None
See application file for complete search history.

(56) References Cited

U.S. PATENT DOCUMENTS

| 2011/0012851 A1* | 1/2011 | Ciesla | G06F 1/1692 |
| | | | 345/173 |
| 2013/0100046 A1* | 4/2013 | Chuang | G06F 3/016 |
| | | | 345/173 |
| 2015/0220116 A1* | 8/2015 | Kemppinen | G06F 3/041 |
| | | | 361/679.01 |
| 2019/0349458 A1* | 11/2019 | Cui | G06F 1/1626 |

FOREIGN PATENT DOCUMENTS

| JP | H09-167541 | 6/1997 |
| JP | 2007-034991 | 2/2007 |
| JP | 2013-093006 | 5/2013 |
| WO | 2010/150563 | 12/2010 |

OTHER PUBLICATIONS

International Search Report for PCT/JP2019/043440 dated Dec. 10, 2019.

* cited by examiner

*Primary Examiner* — Matthew Yeung
(74) *Attorney, Agent, or Firm* — IPUSA, PLLC

(57) ABSTRACT

An input device includes an operation panel member with an operation surface; a support member contacting a side face of the operation panel member to support the operation panel member, the side face being perpendicular to the operation surface of the operation panel member; and an actuator configured to vibrate the support member in a direction parallel to the operation surface. The support member contacts the operation panel member only at the side face, and the operation panel member vibrates in a direction parallel to the operation surface by transmission of a vibration of the support member from the side face to the operation panel member.

15 Claims, 9 Drawing Sheets

INPUT DEVICE

CROSS-REFERENCE TO RELATED APPLICATION

The present application is a continuation filed under 35 U.S.C. 111 (a) claiming the benefit under 35 U.S.C. 120 and 365 (c) of PCT International Application No. PCT/JP2019/043440 filed on Nov. 6, 2019, and designating the U.S., which is based on and claims priority to Japanese Patent Application No. 2018-231045 filed on Dec. 10, 2018. The entire contents of the foregoing applications are incorporated herein by reference.

BACKGROUND OF THE INVENTION

1. Field of the Invention

The present disclosure relates to an input device.

2. Description of the Related Art

Input devices such as touch pads to perform input operations by touching an operation surface are popular. When operating such an input device, an operator does not have operation feeling the same as when operating a switch device, variable resistor, or the like. Accordingly, an input device, capable of providing vibration feedback in which pseudo-operational feeling is provided by applying vibration to an operation surface when being operated, has been proposed.

For example, Patent Documents 1-3 disclose devices each being capable of vibrating an operation panel member having an operation surface in a direction parallel to the operation surface.

CITATION LIST

Patent Documents

[Patent Document 1] Japanese Unexamined Patent Application Publication No. 2013-93006
[Patent Document 2] Japanese Unexamined Patent Application Publication No. 9-167541
[Patent Document 3] Japanese Unexamined Patent Application Publication No. 2007-34991

SUMMARY OF THE INVENTION

Technical Problem

As the operation panel member vibrates, an air around the operation surface also vibrates and a sound is generated. When the operation panel member vibrates in a direction parallel to the operation surface, the vibration of air is reduced and the sound is reduced compared to vibration in a direction perpendicular to the operation surface, but a sound that cannot be ignored in a quiet environment may be generated. For example, when an input device is used in an electric vehicle, sound caused by vibration can be felt as noise.

The present disclosure is intended to provide an input device capable of reducing noise occurring due to vibration of an operation panel member.

Solution to Problem

According to the present disclosure, an input device is provided and includes an operation panel member having an operation surface; a support member in contact with a side face of the operation panel member and supporting the operation panel member, the side face being perpendicular to the operation surface; and an actuator configured to vibrate the support member in a direction parallel to the operation surface. The support member contacts the operation panel member only at the side face, and the operation panel member vibrates in a direction parallel to the operation panel member by transmission of a vibration of the support member from the side face to the operation panel member.

Advantageous Effects of the Invention

According to the present disclosure, sound caused by vibration of the operation panel member can be reduced.

Other objects, features and advantages of the present invention will become more apparent from the following detailed description when read in conjunction with the accompanying drawings.

DETAILED DESCRIPTION OF THE PREFERRED EMBODIMENTS

The inventor of the present invention conducted thorough investigation by simulation and the like in order to investigate the cause of sound which cannot be ignored even when an operation panel member is vibrated in a direction parallel to an operation surface. As a result, as will now be described, it was found out that, during vibration, bending of the operation panel member occurred, and more than a little amount of displacement occurred in a direction perpendicular to the operation surface.

Figure 1:
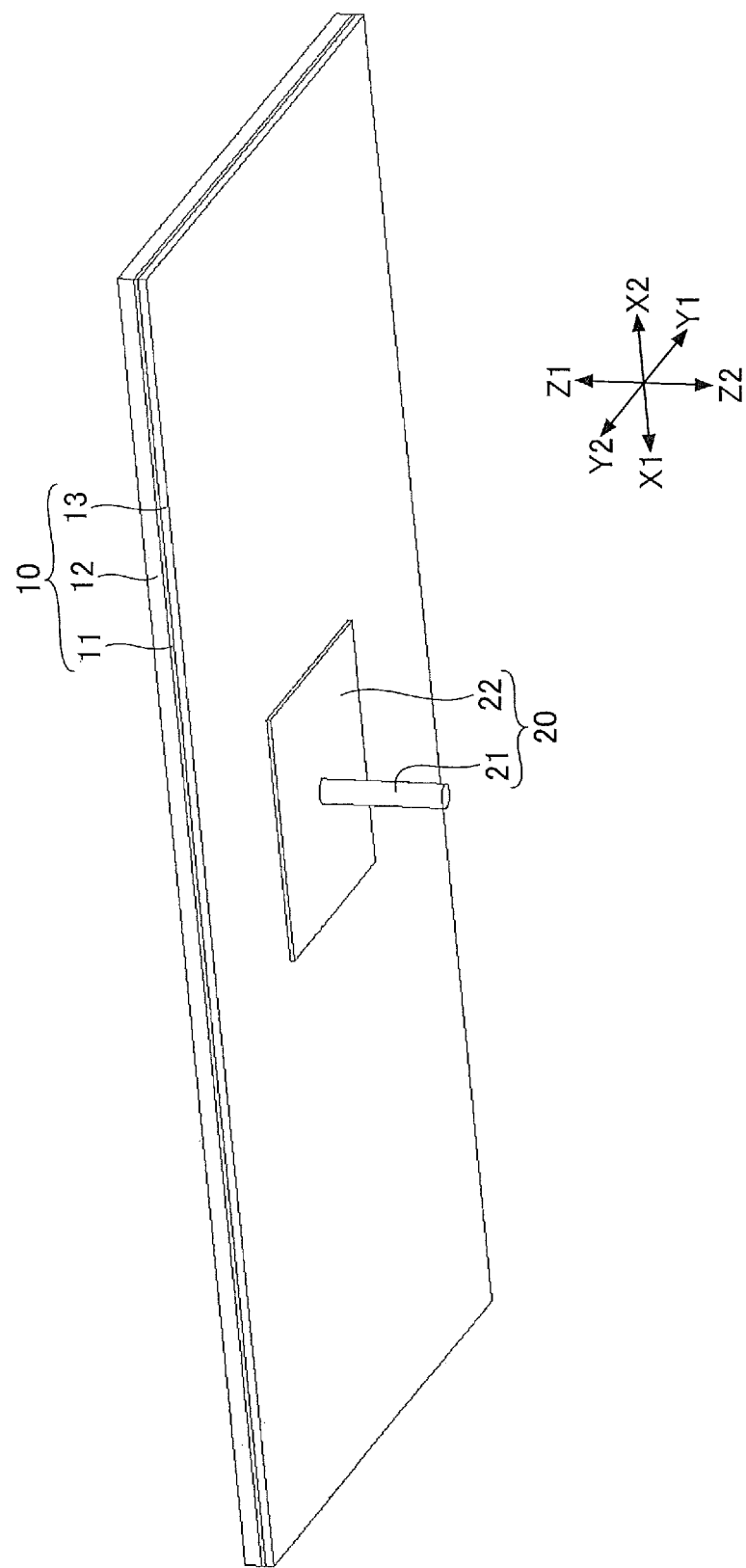
FIG. 1 is a schematic diagram (1) depicting the contents of simulation with respect to a first model.
Figure 2:
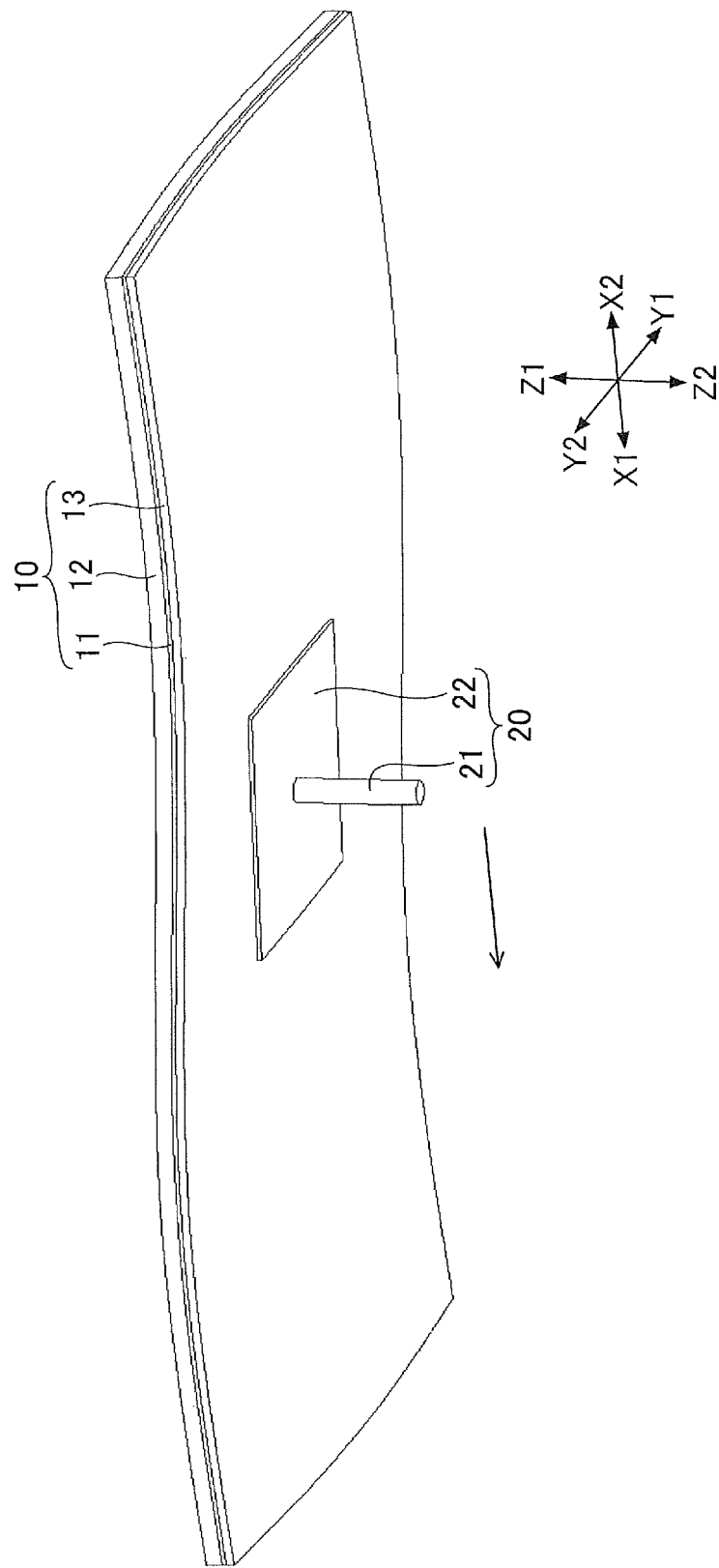
FIG. 2 is a schematic diagram (2) depicting the contents of simulation with respect to the first model.
Figure 3:
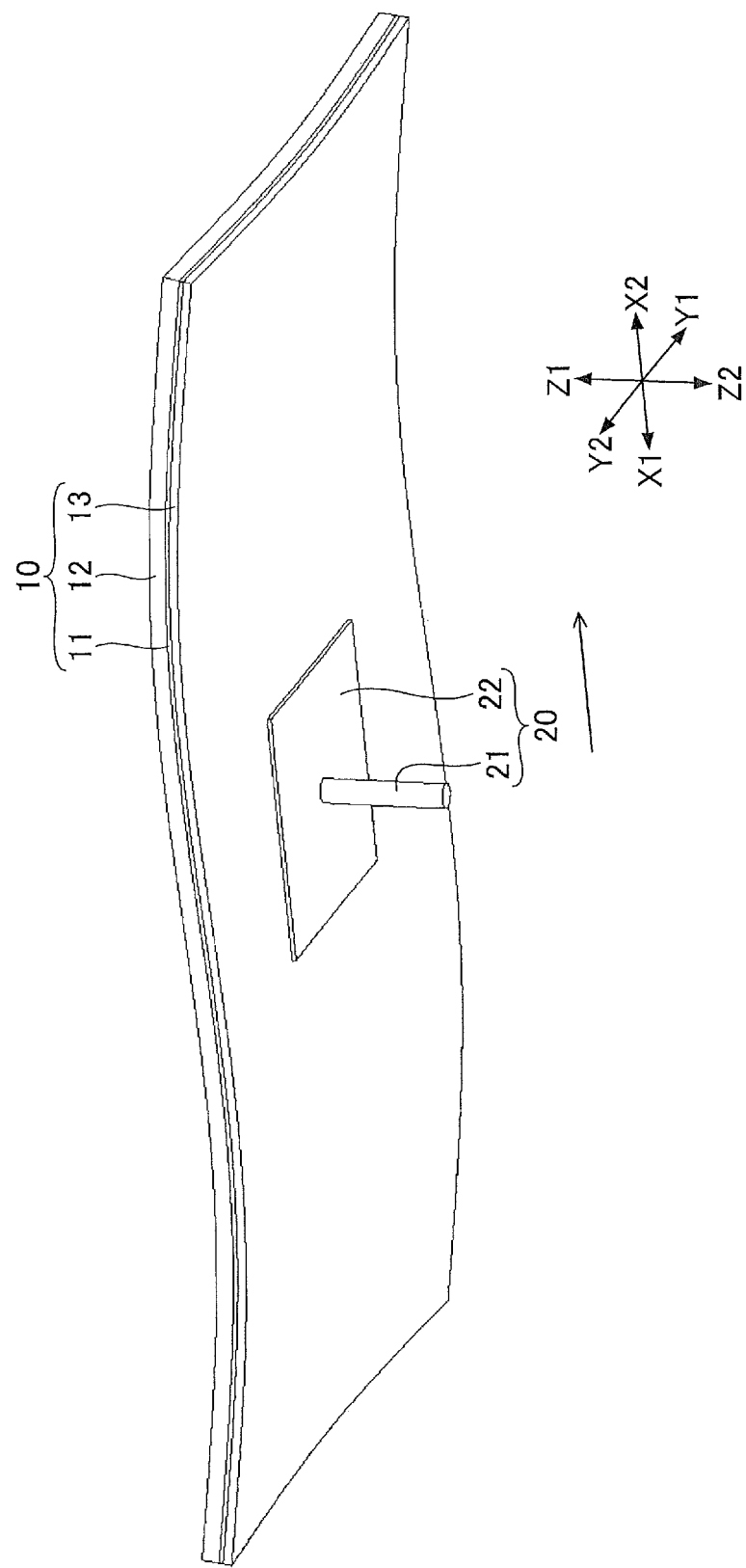
FIG. 3 is a schematic diagram (3) depicting the contents of simulation with respect to the first model.

The contents of simulation performed by the inventor will now be described. FIGS. 1-3 are schematic diagrams depicting the contents of simulation for a first model.

As depicted in FIG. 1, the first model includes an operation panel member 10 and a support member 20 supporting the operation panel member 10.

The operation panel member 10 has a plate shape that has a rectangular shape in plan view, and has a short side length of 80 mm, a long side length of 160 mm, and a thickness of 4 mm. The operation panel member 10 includes a sensor substrate 11, a first panel 12 on one side of the sensor substrate 11, and a second panel 13 on the other side of the sensor substrate 11. The sensor substrate 11 is a glass epoxy (flame retardant type 4 (FR4)) substrate and the materials of the first panel 12 and the second panel 13 are an acrylonitrile-butadiene-styrene (ABS) resin.

Hereinafter, one of the long side directions of the operation panel member 10 is referred to as an X1 direction and the other is referred to as an X2 direction; one of the short side directions is referred to as a Y1 direction and the other is referred to as a Y2 direction. A direction that is perpendicular to an operation surface and is a direction of the first panel 12 when viewed from the sensor substrate 11 is referred to as a Z1 direction and the opposite direction is referred to as a Z2 direction.

The support member 20 has a movable section 21 and a securing section 22 for securing the movable section 21 to the second panel 13. The securing section 22 is secured to the center, in plan view, of the operation panel member 10, and the movable section 21 is connected to the center, in plan view, of the securing section 22. Thus, the movable section 21 is secured to the center, in plan view, of the operation panel member 10. The support member 20 is made of steel.

The movable section 21 is made to oscillate in the X1 direction and the X2 direction, that is, in the directions parallel to the operation surface of the operation panel member 10. At this time, the maximum amplitude is about 0.1 mm and the maximum acceleration is about 98 m/s$^2$. FIG. 2 depicts the shape of the first model when the operation panel member 10 is moved in the X1 direction, and FIG. 3 depicts the shape of the first model when the operation panel member 10 is moved in the X2 direction. In FIGS. 2 and 3, the displacement amounts in the directions (Z1 direction and Z2 direction) perpendicular to the operation surface are emphasized at 200 times the displacement amounts with respect to the plane of the operation surface.

As depicted in FIGS. 2 and 3, the operation panel member 10 greatly bends in directions perpendicular to the operation surface (in the Z1 and Z2 directions). The magnitude of sound generated due to the bending in the vicinity of the operation surface amounts to about 94 dB, and the magnitude of sound at a position 100 mm away from the operation surface in the Z1 direction is about 70 dB. A magnitude of sound 70 dB is equal, for example, to a magnitude of sound in a noisy office.

With respect to the first model, the above-described simulation result was obtained. Based on the result, an operation panel member seems to greatly bend in directions perpendicular to an operation surface, resulting in noise generation, with respect to a conventional input device.

In order to reduce such bending, the inventor of the present invention conducted further investigation through simulation and the like. As a result, it has been found that bending of an operation panel member can be reduced by vibrating the operation panel member from an outer side rather than from an inner side of the operation panel member as will now be described.

Figure 4:
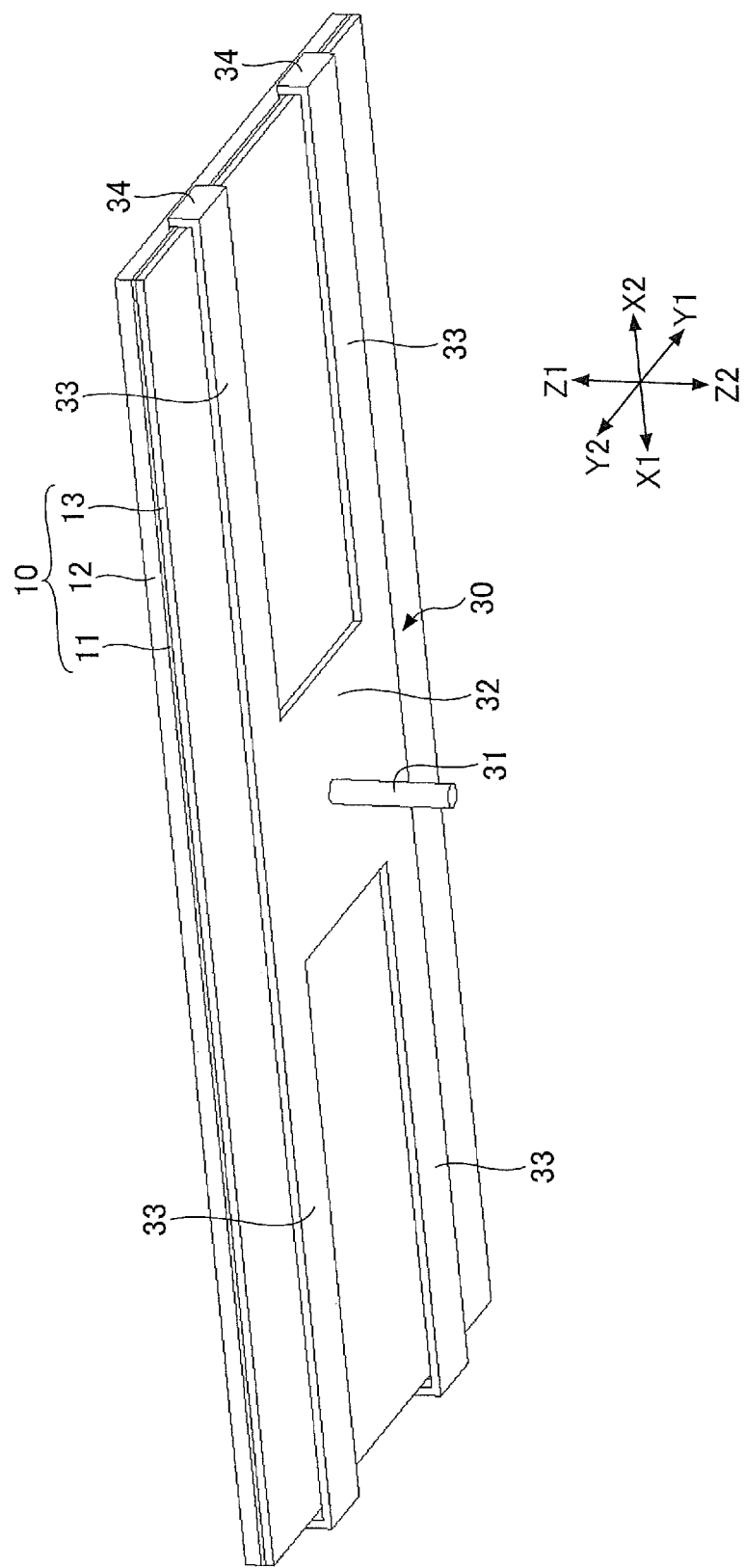
FIG. 4 is a schematic diagram (1) depicting the contents of simulation with respect to a second model.
Figure 5:
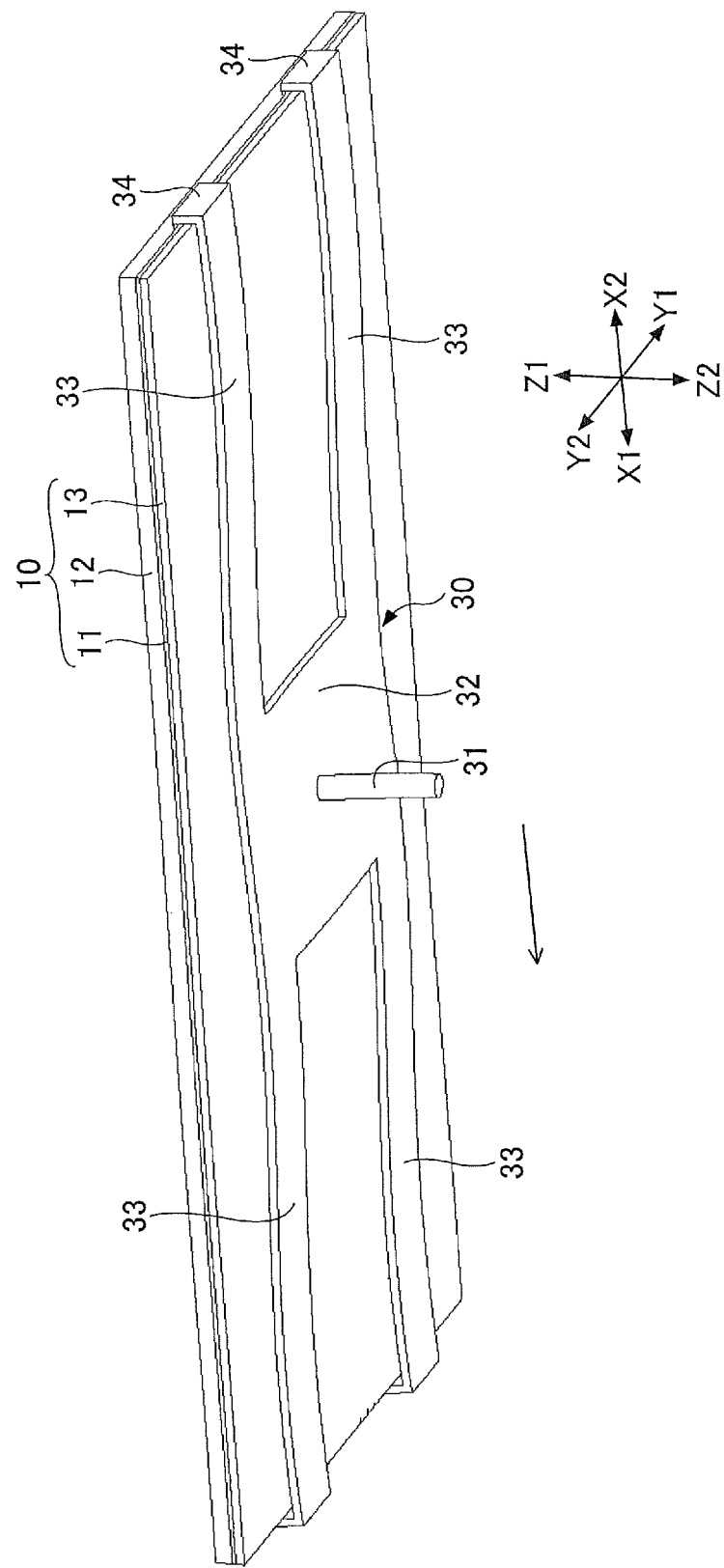
FIG. 5 is a schematic diagram (2) depicting the contents of simulation with respect to the second model.
Figure 6:
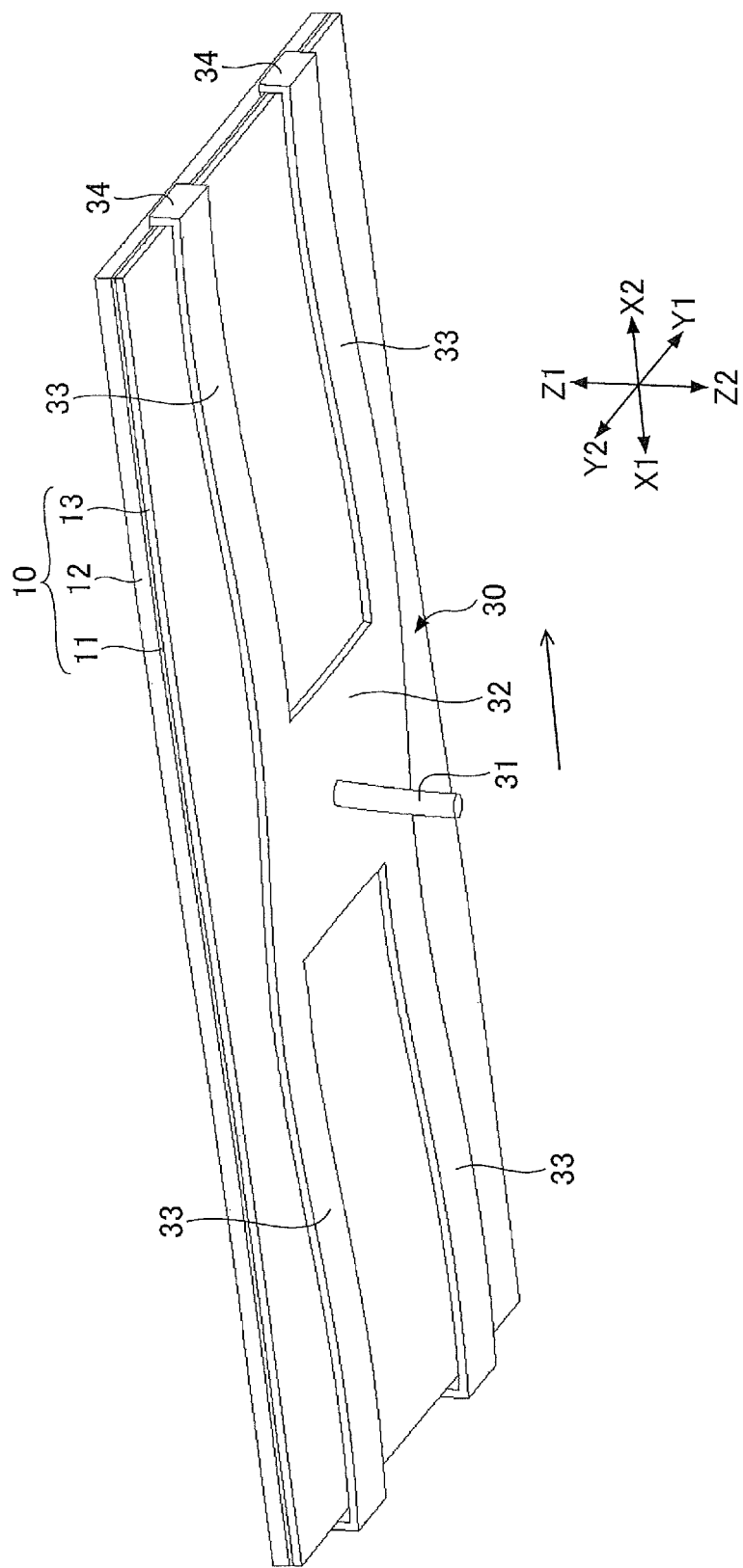
FIG. 6 is a schematic diagram (3) depicting the contents of simulation with respect to the second model.

Details of the simulation performed by the inventor will now be described. FIGS. 4-6 are schematic diagrams depicting the contents of the simulation with respect to a second model.

As depicted in FIG. 4, the second model includes an operation panel member 10 and a support member 30 supporting the operation panel member 10.

The support member 30 has a movable section 31, a hub 32 with which the movable section 31 is connected at the center, two arms 33 extending in the X1 direction from the hub 32, two arms 33 extending in the X2 direction from the hub 32, and contact sections 34 at the extending ends of these four arms 33, respectively. The contact sections 34 contact side faces, perpendicular to the operation surface, of the operation panel member 10. The two contact sections 34 in the X1 direction of the movable section 31 and the two contact sections 34 in the X2 direction of the movable section 31 sandwich and support the operation panel member 10. The hub 32 and the arms 33 are spaced apart from the operation panel member 10 in the Z2 direction. That is, there is a space from the operation panel member 10 to the hub 32 and the arms 33. The material of the support member 30 is steel.

The movable section 31 is made to oscillate in the X1 direction and the X2 direction, that is, in the directions parallel to the operation surface of the operation panel member 10. At this time, the maximum amplitude is about 0.1 mm and the maximum acceleration is about 98 m/s$^2$. FIG. 5 depicts the shape of the second model when the operation panel member 10 is moved in the X1 direction, and FIG. 6 depicts the shape of the second model when the operation panel member 10 is moved in the X2 direction. In FIGS. 5 and 6, similarly to FIGS. 2 and 3, the displacement amounts in the directions (Z1 direction and Z2 direction) perpendicular to the operation surface are emphasized at 200 times the displacement amounts with respect to the plane of the operation surface.

As depicted in FIGS. 5 and 6, the support member 30 bends, but the operation panel member 10 significantly less bends in the Z1 and Z2 directions compared to the first model. The magnitude of sound generated due to the bending in the vicinity of the operation surface is about 77 dB. The magnitude of sound at a position 100 mm away from the operation surface in the Z1 direction was not been able to be calculated by the simulation because the magnitude of sound was extremely small. In this regard, a difference in magnitude of sound between the first model and the second model in the vicinity of the operation surface was 17 dB. Therefore, the magnitude of sound at the position 100 mm away from the operation surface in the Z1 direction is estimated to be about 52 dB. A magnitude of sound, 50 dB is equal, for example, to a magnitude of sound in a quiet office.

With respect to the second model, the above-described simulation result was obtained. From the result, it can be said that, by vibrating the operation panel member from the outer sides, bending of the operation panel member can be reduced, and noise can be reduced.

Hereinafter, embodiments of the present disclosure will be described in detail with reference to the accompanying drawings. In the specification and drawings, duplicate descriptions of elements having substantially the same functional configurations may be omitted by adding the same reference numerals.

Figure 7:
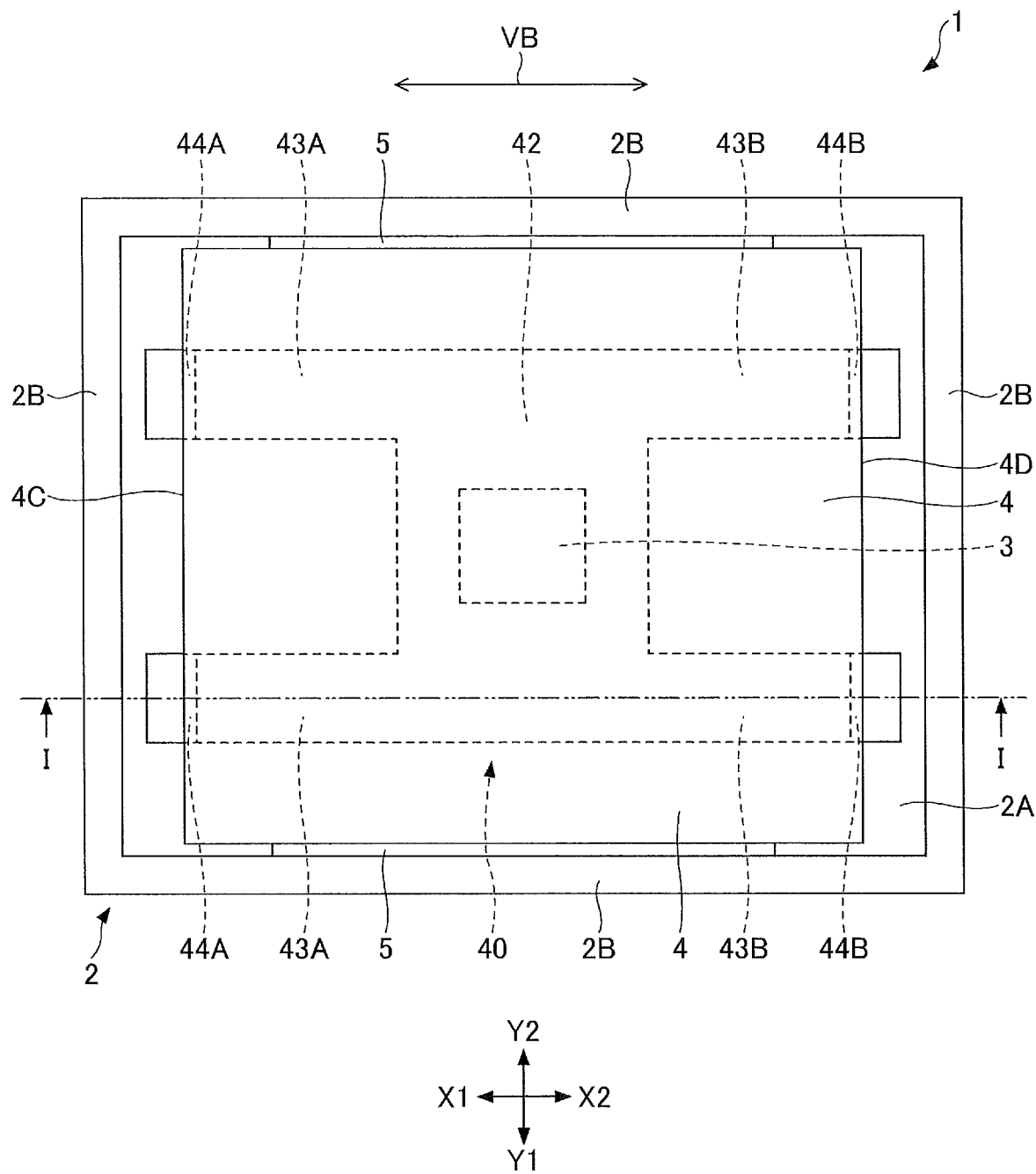
FIG. 7 is a plan view illustrating an input device according to an embodiment.
Figure 8:
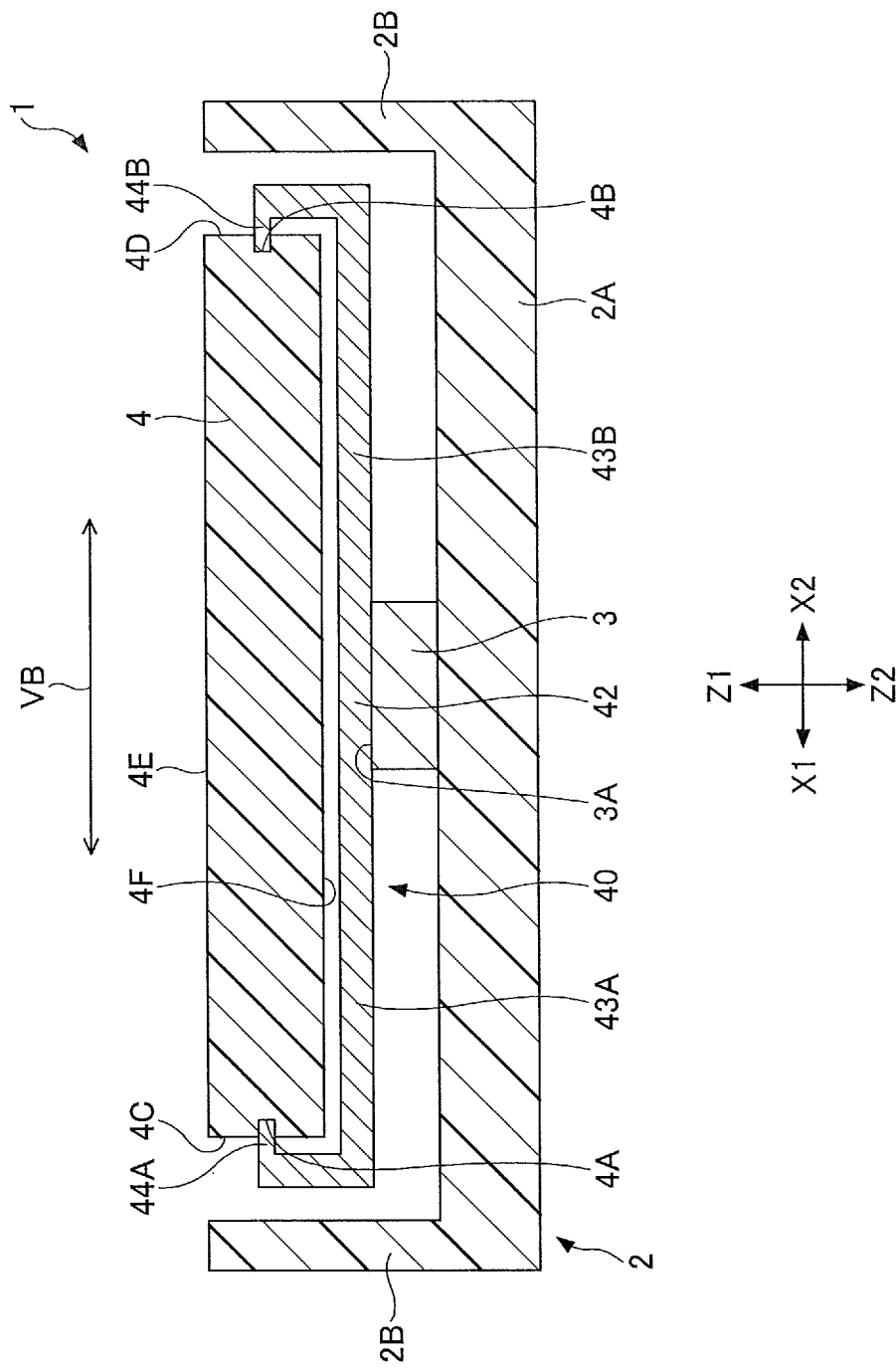
FIG. 8 is a sectional view illustrating the input device according to the embodiment.
Figure 9:
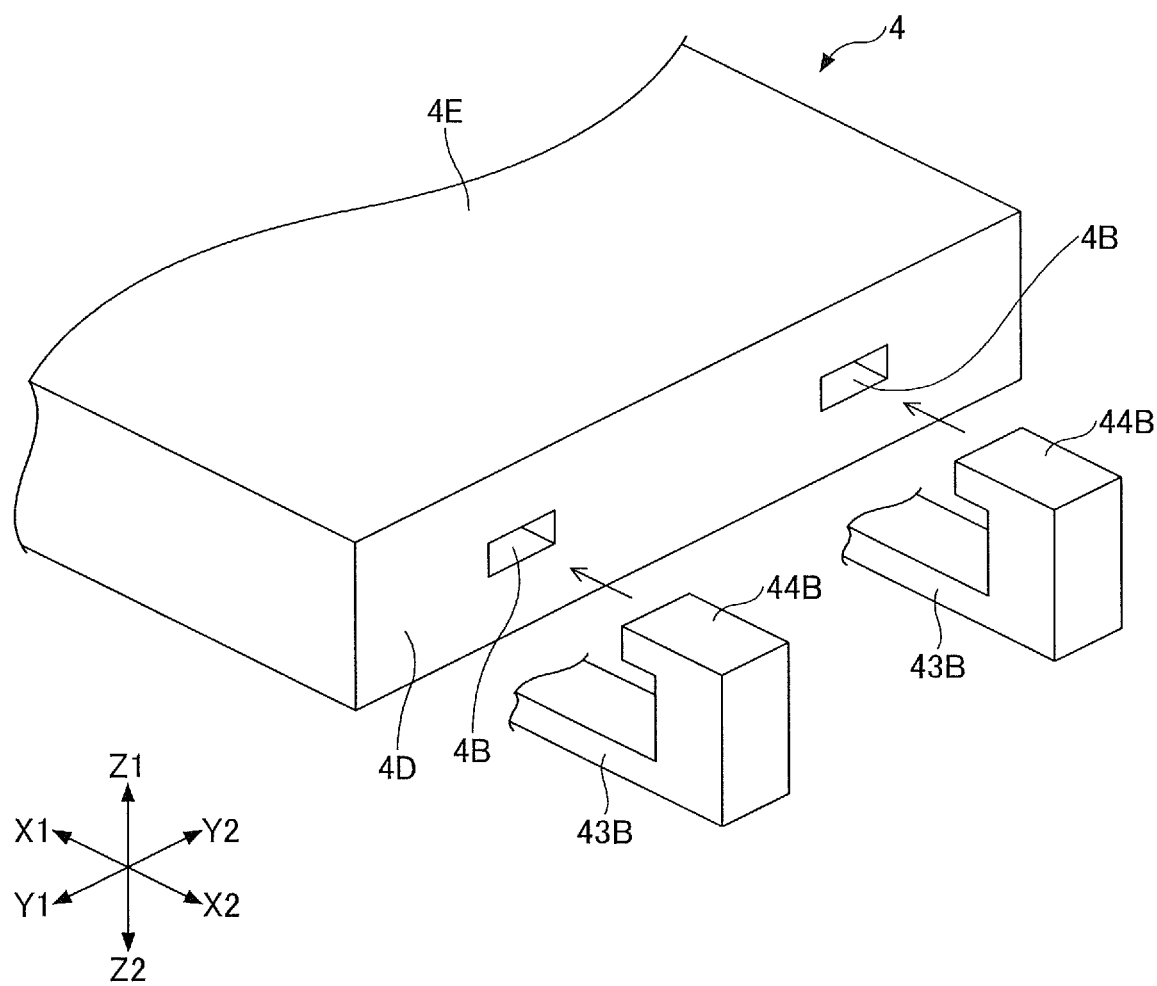
FIG. 9 is an exploded perspective view depicting a portion of the input device according to the embodiment.

FIG. 7 is a plan view illustrating an input device according to an embodiment, and FIG. 8 is a sectional view illustrating the input device according to the embodiment. FIG. 9 is an exploded perspective view depicting a portion of the input device according to the embodiment. FIG. 8 is the sectional view taken along the I-I line of FIG. 7.

As depicted in FIGS. 7 and 8, the input device 1 according to the embodiment includes a housing 2, an actuator 3, an operation panel member 4, guide members 5, and a support member 40.

The housing 2 has, for example, a substantially-square-shaped bottom plate section 2A and a side wall section 2B extending upward from the four-side peripheries of the bottom plate section 2A, and has a box shape in which the upper side (the Z1 direction side) is open. For example, the housing 2 is made of a synthetic resin such as ABS resin through injection molding.

The actuator 3 is at the center, in plan view, of the bottom plate section 2A. The actuator 3 includes a movable section on a top face 3A and has a function to vibrate an object mounted to the movable section in directions parallel to the top face 3A, i.e., in the X1 direction and the X2 direction in the present embodiment. The actuator 3 is, for example, a solenoid actuator.

The support member 40 has a hub 42, two arms 43A extending in the X1 direction from the hub 42, two arms 43B extending in the X2 direction from the hub 42, hooks 44A at the extending ends of the two arms 43A, and hooks 44B at the extending ends of the two arms 43B. The support member 40 is generally H-shaped in plan view. The hooks 44A are shaped to extend upward in the Z1 direction from the extending ends of the arms 43A and bend to extend in the X2 direction. The hooks 44B are shaped to extend upward in the Z1 direction from the extending ends of the arms 43B and bend to extend in the X1 direction. The hooks 44A contact a side face 4C, at the X1 direction side, of the operation panel member 4; and the hooks 44B contact a side face 4D, at the X2 direction side, of the operation panel member 4. The hub 42 is secured to the movable section of the actuator 3. The support member 40 is made of a metal such as steel. The alms 43A are examples of a first arm, the arms 43B are examples of a second arm, the hooks 44A are examples of a first contacting portion, and the hooks 44B are examples of a second contacting portion.

The operation panel member 4 includes, for example, a touch sensor and a decorative panel. The decorative panel is provided at the Z1 direction side of the touch sensor, and a user can operate a surface of the decorative panel as the operation surface 4E of the operation panel member 4. In response to the operation surface 4E being operated by the user, the operated position and the operating load are sensed by the touch sensor.

The operation panel member 4 has, for example, a flat plate shape having a rectangular shape in plan view. Two recesses 4A are formed from the side face 4C of the operation panel member 4, and two recesses 4B are formed from the side face 4D. The extending ends of the hooks 44A fit into the recesses 4A and the extending ends of the hooks 44B fit into the recesses 4B.

A back face 4F, opposite to the operation surface 4E, of the operation panel member 4 is spaced apart from the hub 42, the arms 43A, and the arms 43B. That is, only the hooks 44A and the hooks 44B of the support member 40 are in contact with the operation panel member 4.

The guide members 5 are disposed between the side wall section 2B and the operation panel member 4 on the Y1 direction side and on the Y2 direction side of the operation panel member 4, and guides vibrations of the operation panel member 4 in the X1 direction and the X2 direction.

In an example of a user's operation of the input device 1 that is has the structure described above, when the operation panel member 4 is operated by the user, the actuator 3 vibrates the support member 40 in the X1 direction and the X2 direction in accordance with the operated position and the operating load, as indicated by arrows VB. The vibration of the support member 40 is transmitted to the operation panel member 4 through the side faces 4C and 4D, and the operation panel member 4 vibrates in the X1 direction and the X2 direction accordingly. The user can perceive how the user's operation performed on the input device 1 is reflected, by feeling the vibration from the operation surface 4E. For example, when the input device 1 is provided at a center console as one of various switches in an automobile, a driver can perceive from vibration of the operation panel member 4 how the driver has performed an operation, without shifting the driver's line of sight toward the input device 1.

In the present embodiment, vibration of the support member 40 is transmitted to the operation panel member 4 through the side faces 4C and 4D, and the operation panel member 4 vibrates accordingly. As is obvious from the result of the above-described simulation, the operation panel member 4 does not easily bend. That is, the position of the operation surface 4E does not easily change in the Z1 direction and the Z2 direction. Thus, it is possible to reduce sound generated from vibration of the operation panel member 4.

The support member 40 preferably contacts the side faces 4C and 4D on a plane including the center of mass of the operation panel member 4 and parallel to the operation surface 4E. As a result, it is possible to directly vibrate the plane including the center of mass of the operation panel member 4 and parallel to the operation surface 4E in the X1 direction and the X2 direction, and it is possible to reduce bending of the operation panel member 4 more effectively.

A portion of the back face 4F may be in contact with the support member 40. However, frictional force between the support member 40 and the back face 4F may disrupt a vibration balance and cause the operation panel member 4 to bend. Therefore, it is preferable that the back face 4F be spaced apart from the support member 40 and that the support member 40 be in contact with the operation panel member 4 only at the side faces 4C and 4D.

In addition, although the position and the number of actuators 3 are not particularly limited, it is preferable that a single actuator 3 be disposed on the back face 4F side of the operation panel member 4 in order to equalize a vibration transmitted from the side face 4C and a vibration transmitted from the side face 4D. In particular, the actuator 3 is preferably disposed on the back face 4F side, at the center between the side face 4C and the side face 4D.

Although the input devices have been described with reference to the embodiments, the present invention is not limited to the embodiments. Various modifications and/or improvements can be made within the scope of the present invention.

What is claimed is:

1. An input device comprising:
   a housing;
   an operation panel member with an operation surface;
   a support member contacting only a side face of the operation panel member to support the operation panel member, the side face being perpendicular to the operation surface of the operation panel member; and
   an actuator configured to vibrate the support member along a first direction parallel to the operation surface and a second direction opposite to the first direction,
   wherein
   the support member includes:
   a hub that is arranged so as to have a space between the hub and the operation panel and secured to the actuator;
   a first arm extending from the hub in the first direction;
   a second arm extending from the hub in the second direction;
   a first contacting portion, at an extending end of the first arm, contacting a portion of the side face; and
   a second contact portion, at an extending end of the second arm, contacting another portion of the side face,
   wherein the first contact portion and the second contact portion are configured to sandwich and support the operation panel member, wherein the actuator is secured between the housing and the support member, and wherein the operation panel member vibrates along the first direction and the second direction by transmission of a vibration of the support member from a part of the side face that faces in the first direction and a part of the side face that faces in the second direction to the operation panel member.

2. The input device as claimed in claim 1, wherein
the actuator is on a side opposite to the operation surface of the operation panel member.

3. The input device as claimed in claim 1, wherein
a recess is formed from the side face, and
the support member has a hook, an extending end of the hook fitting into the recess.

4. The input device as claimed in claim 2, wherein
a recess is formed from the side face, and
the support member has a hook, an extending end of the hook fitting into the recess.

5. The input device as claimed in claim 1, wherein
a recess is formed from the side face, and
the support member has a hook, an extending end of the hook fitting into the recess.

6. The input device as claimed in claim 1, wherein
a recess is formed from the side face, and
the support member has a hook, an extending end of the hook fitting into the recess.

7. The input device as claimed in claim 2, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

8. The input device as claimed in claim 1, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

9. The input device as claimed in claim 1, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

10. The input device as claimed in claim 3, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

11. The input device as claimed in claim 4, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

12. The input device as claimed in claim 5, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

13. The input device as claimed in claim 6, wherein
the support member includes:
a hub secured to the actuator;
a first arm extending from the hub in a first direction parallel to the operation surface;
a second arm extending from the hub in a second direction opposite to the first direction;
a first contacting portion, at an extending end of the first arm, contacting a portion of the side face; and
a second contact portion, at an extending end of the second arm, contacting another portion of the side face.

14. The input device as claimed in claim 3,
wherein the support member and the hook are integrally formed of a metal.

15. The input device as claimed in claim 1, wherein the first contact portion and the second contact portion are configured to directly contact the part of the side face on the side of the first direction and the part of the side face on the side of the second direction of the operation panel member.

* * * * *